Patented Feb. 3, 1931

1,791,062

UNITED STATES PATENT OFFICE

MARTIN LUTHER, OF MANNHEIM, AND CLAUS HEUCK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CONDENSATION PRODUCT OF UREA

No Drawing. Application filed October 3, 1927, Serial No. 223,851, and in Germany October 8, 1926.

The present invention relates to the manufacture and production of condensation products of urea and formaldehyde.

An advantageous method of producing the said condensation products consists in carrying out the condensation in an aqueous solution of urea and formaldehyde of slightly acid reaction which is maintained at degree equal to a hydrogen ion concentration pH=4 to 7 by the employment of suitable buffer substances. Preferably, however, the actual condensation is effected at a hydrogen ion concentration of pH=about 4 to 6, and the subsequent concentration process at pH=6 to 7 and more at temperatures not exceeding 50° C., whereupon the product is hardened at temperatures between 50 and 100° C.

We have now found that the duration of the process of hardening the reaction products obtained in this manner is considerably reduced by adding to the condensation products, prior to hardening, agents capable of furnishing acids under the conditions of the heat treatment required for the hardening. Both inorganic and organic substances may be employed, and as examples of suitable additions may be mentioned magnesium chloride, formic acid esters and the like. Use may also be made of formamide, which, by hydrolysis, furnishes ammonium formate, this latter being then transformed by surplus formaldehyde, contained in the condensation product into hexamethylenetetramine and formic acid.

The products obtained in the manner above described are found to be equivalent in quality to the products obtained without an addition of the said acid forming substances, but the process according to this invention has the advantage of being carried out in a considerably shorter time.

The following examples will further illustrate how the invention may be carried out in practice, but the invention is not restricted to the said examples.

Example 1

240 parts of urea dissolved in 200 parts of water are condensed with 800 parts of 30 per cent formaldehyde in the presence of 1 part of primary sodium phosphate. After the condensation, the hydrogen ion concentration is reduced to pH=6 to 7 by the addition of 4 parts of secondary, and 1 part of tertiary, sodium phosphate, and maintained constant thereat, the solution being concentrated in vacuo at 50° C. After about half the water has distilled over, 2 to 5 parts of formamide are added to the concentrated solution of the condensation product. The concentration of the solution is then continued in vacuo, and the resulting viscous product is poured into a mould. After heating from 60 to 80° C. in a drying cupboard for 24 hours, the product will be completely hardened.

Example 2

A solution of 1200 parts of urea in 800 parts of water is condensed with 4000 parts of 30 per cent formaldehyde, a buffer mixture consisting of 5 parts of 10 per cent acetic acid and 1 part of a 10 per cent sodium acetate solution being employed. After the condensation, 7 parts of dilute sodium acetate solution are added to the solution of the urea-formaldehyde condensation product, and the solution is then concentrated in vacuo. Towards the end of this stage a concentrated solution of 10 parts of magnesium chloride is added. The viscous product is completely hardened by keeping it at a temperature of 70° for about 12 hours.

What we claim is:

1. In the process of producing condensation products of urea and formaldehyde by carrying out the condensation with an aqueous solution of urea and formaldehyde of slightly acid reaction, in which a hydrogen ion concentration of pH=4 to 7 is maintained by the addition of buffer compounds, the step of adding to the condensation product, prior to hardening, a substance capable of forming acid in the liquid condensation product during the heat treatment requisite for the said hardening.

2. In the process of producing condensation products of urea and formaldehyde by carrying out the condensation with an aqueous solution of urea and formaldehyde of slightly acid reaction, in which a hydrogen ion concentration of pH=4 to 7 is maintained by the addition of buffer compounds, the step of adding to the condensation product, prior to hardening, a substance capable of forming acid in the liquid condensation product during the hardening process and hardening at temperatures between 50 and 100° C.

3. In the process of producing condensation products of urea and formaldehyde by carrying out the actual condensation in an aqueous solution of urea and formaldehyde of a hydrogen ion concentration of pH=4 to 6 and concentrating the solution below 50° C. at a hydrogen ion concentration of pH=6 to at least 7, the said hydrogen ion concentrations, being maintained by the addition of buffer compounds, the step of adding to the condensation product, prior to hardening a substance capable of forming acid in the liquid condensation product during the hardening process at temperatures between 50 and 100° C.

4. In the process of producing condensation products of urea and formaldehyde by carrying out the actual condensation in an aqueous solution of urea and formaldehyde of a hydrogen ion concentration of pH=4 to 6 and concentrating the solution below 50° C. at a hydrogen ion concentration of pH=6 to at least 7 the said hydrogen ion concentrations being maintained by the addition of buffer compounds, the step of adding formamide to the condensation product, prior to hardening.

In testimony whereof we have hereunto set our hands.

MARTIN LUTHER.
CLAUS HEUCK.